United States Patent [19]

Fonneland et al.

[11] Patent Number: 5,032,002
[45] Date of Patent: Jul. 16, 1991

[54] WRITE WITH LIGHT OPTICAL NOTCHING FILTER

[75] Inventors: Nils J. Fonneland, Lake Ronkonkoma; Robert W. Brandstetter, Levittown; Herman Kaplan, Great Neck; Philip G. Grieve, New York, all of N.Y.

[73] Assignee: Grumman Aerospace Corporation, Bethpage, N.Y.

[21] Appl. No.: 311,070

[22] Filed: Feb. 14, 1989

[51] Int. Cl.$^5$ .......................................... G02B 27/42
[52] U.S. Cl. ............................................... 350/162.12
[58] Field of Search ................... 350/162.12, 356, 342, 350/355, 353, 360; 364/822

[56] References Cited

U.S. PATENT DOCUMENTS

| | | |
|---|---|---|
| 4,370,024 | 1/1983 | Task et al. ....................... 350/162.12 |
| 4,522,455 | 6/1985 | Lindig et al. . |
| 4,645,300 | 2/1987 | Brandstetter et al. . |

Primary Examiner—Bruce Y. Arnold
Assistant Examiner—J. P. Ryan
Attorney, Agent, or Firm—Scully, Scott, Murphy & Presser

[57] ABSTRACT

An optical notching filter is disclosed in which an optical spatial filter therein is formed by a spatial light modulator which is written into by light. The optical notching filter system of the present invention provides a linear phase and amplitude response with applications for high speed adaptive filtering to filter out noise and signals of no interest. In one particular disclosed embodiment, the write with light optical notching filter system of the present invention is designed to adaptively excise interference from Radio Frequency (RF) signals, such as are utilized in communications or radar systems. The technical approach of the present invention provides a more compact system design than similar electronically addressed optical notching filtering systems, and also significantly reduces the complexity and attendant power requirements of the system. Different embodiments of a write with light optical notching filter system can operate with either nonochromatic or polychromatic light sources. Moreover, the write light source can be independent of the read light source, such that any suitable write or read light source can be utilized therein, either with single pass or recursive optical arrangements.

6 Claims, 5 Drawing Sheets

Single Pass Write
Read Recursion

Single Pass Read
Write Recursion

Write Recursion
Read Recursion

WRITE WITH LIGHT OPTICAL NOTCHING FILTER

BACKGROUND OF THE INVENTION

1. Field of the Invention

The present invention relates generally to optical information processing systems, and more particularly pertains to a write with light optical notching filter system in which an optical spatial filter therein is formed by a liquid crystal spatial light modulator (SLM) which is written onto with light.

2. Discussion of the Prior Art

In selective frequency filtering, there are significant advantages to performing the filtering function optically with spatial filters instead of by the use of a more common electronic filter, particularly if a number of filters are desired. Optical spatial filtering is typically accomplished in the prior art with filtering systems having either a single stage, or multiple recursive stages as disclosed and taught, for example, by U.S. Pat. Nos. 4,522,466 and 4,645,300. In single stage prior art systems using a programmable spatial filter, the maximum filter attenuation is approximately 25 db. In multiple recursive stage systems, the programmable spatial filter (PSF) stages are effectively cascaded by means of recursions, and the attenuation achieved thereby can be increased as a function of the number of stages or recursions.

Such programmable spatial filter systems usually incorporate a source of collimated coherent light, and the light beam therefrom is modulated by a suitable transducer, which is followed by a convex lens, an optical spatial filter, which can be a programmable spatial filter, a second convex lens, and a detection means. In such a system, light from the source passing through the transducer is modulated and then forms a diffraction pattern (Fourier transform) at the focal plane of the first lens. The second lens provides the inverse Fourier transform of the diffraction pattern that passes through the spatial filter, resulting in a spatial frequency filtered representation of the modulated input light signal. The light signal output of the second lens contains all of the spatial frequencies appearing in the Fourier plane minus those selectively filtered out by the programmable spatial filter. Changing the spatial frequency distribution of the programmable spatial filter in the Fourier plane results in an inverse transform image with a corresponding resolution/high frequency, contrast/low spatial frequency and phase response.

In an optical, filtering system for RF signals, RF input signals are fed into an acousto-optic modulator to modulate a laser beam. The modulated output beam is passed through an optical Fourier transform lens to produce a spatial frequency distribution at its back focal plane. This signal contains a one-for-one spatial and temporal correspondence with the RF frequency distribution. The transformed beam is then directed through the spatial filter which is also located at the back focal plane of the transform lens. A programmable spatial filter is used for the filtering function, and the optical transmission from point-to-point is controlled by the spatial filter such that some spatial frequencies are blocked and others are passed in accordance with the programmed notch frequencies. Optical spatial frequencies passing through the spatial filter consist of the laser optical carrier frequency modulated with the RF frequency. An optical inverse Fourier transform lens images the filtered beam, and the filtered beam is then passed to an optical mixer where it is mixed with a local oscillator reference beam. Optically combining the modulated laser beam with the local oscillator beam and directing the sum onto a square-law photodetector results in the generation of the difference frequency by a heterodyning action. The electrical output of the photodetector is amplified and initially filtered, and can then be subjected to conventional post processing.

The prior art has also addressed the concept of adaptive filtering, or the electronic programming of a filter in accordance with a time varying criteria. The concept of a filter matched to the spectrum of the desired signal theoretically should provide optimum filtering. In actual practical situations, particularly when detecting spread spectrum signals contaminated with higher level narrow band signals, a narrow band (notch) filter within the passband of the wide band spread spectrum signal can reduce or eliminate the high level signal from the spread spectrum signal.

SUMMARY OF THE INVENTION

Accordingly, it is a primary object of the present invention to provide an optical notching filter in which an optical spatial filter therein is formed by a spatial light modulator which is written onto by light.

The system of the present invention provides a linear phase and amplitude response with applications for high speed adaptive RF filtering to filter out noise and signals of no interest. The subject invention can enhance the performance of various types of receivers, such as electronic counter measures and electronic warfare receivers, to provide a look around capability therefor, and to aid in the detection of special emissions, and also in communications and radar receivers employed in terrestial, airborne or space platforms.

In a particular disclosed embodiment, the write with light optical notching filter system of the present invention is designed to adaptively excise interference from Radio Frequency (RF) signals, such as are utilized in communications or radar systems, and in this regard is similar to the recursive optical notching filter systems disclosed in U.S. Pat. Nos. 4,522,466 and 4,645,300. The optical notching filter system of the present invention uses a write with light approach on a liquid crystal spatial light modulator to form a programmable spatial filter, rather than using an electronically controlled and addressable liquid crystal programmable spatial filter and cueing receiver as in U.S. Pat. Nos. 4,522,466 and 4,645,300. This technical approach advantageously eliminates much of the recursive optical notching filter electronics to provide a much more compact system design, and also significantly reduces the complexity and attendant power requirements of the system. Moreover, the technical approach of the subject invention significantly reduces the alignment sensitivities of the programmable spatial filter, and can employ stacked spatial light modulators to achieve greater notch depths.

A further object of the subject invention is the provision of a write with light optical notching filter system which in different embodiments can operate with either monochromatic or polychromatic light sources. Moreover, the write light source can be independent of the read light source, such that any suitable write or read light source can be utilized therein. In greater detail, one disclosed multispectral embodiment uses a noninterfering noncoherent radiation source to write onto the spatial light modulator to generate a spatial mask thereon, which allows the use of any suitable laser source as the signal carrier. The noncoherent radiation source can be an LED, a flourescent source, or an incandescent source, and preferred embodiments can advantageously utilize an LED for the write function.

The write with light optical notching filter system of the present invention utilizes either a single wavelength or multiple wavelength light source to control the location of the notches in a passboard of an RF receiver. The controls can be either self activated, as in embodiments where an intensity threshold activates the blocking mechanism in the Fourier plane, or by a programmed filter impulse response, static or dynamic, achieved by polychromatic controls. For example, a red wavelength $\lambda_1$ might not write on the spatial light modulator (SLM), while a second write wavelength $\lambda_2$ would cause the spatial light modulator (SLM) to be activated in a region selected for notching. A combination of wavelengths can be used to achieve any desired filter response, temporal and spatial, including notch width, notch length, and notch resolution. For example, if the spatial light modulator is more sensitive to green wavelengths and less sensitive to red wavelengths, a yellow wavelength source would write less than a green source but more than a red source. Activation thresholds can be controlled by both wavelength and intensity of the write beam.

In summary, the subject invention can writeonto a spatial light modulator with light from any suitable source, and can use a noninterfering noncoherent source to generate a mask on the programmable spatial light modulator. Moreover, the technical approach of the present invention eliminates most of the electronics required for an optical notching filter as is known in the prior art, presents a very compact design, can be used in refractive and reflective programmable spatial filter configurations (e.g. a write beam can reflect back onto the programmable spatial light modulator from a dielectric coated mirror which passes a read wavelength), can use recursion provided by an off axis write beam, can provide adjustable multiple passes for control of the notch depth, or alternatively can employ stacked spatial light modulators to achieve greater notch depths.

BRIEF DESCRIPTION OF THE DRAWINGS

The foregoing objects and advantages of the present invention for a write with light optical notching filter system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
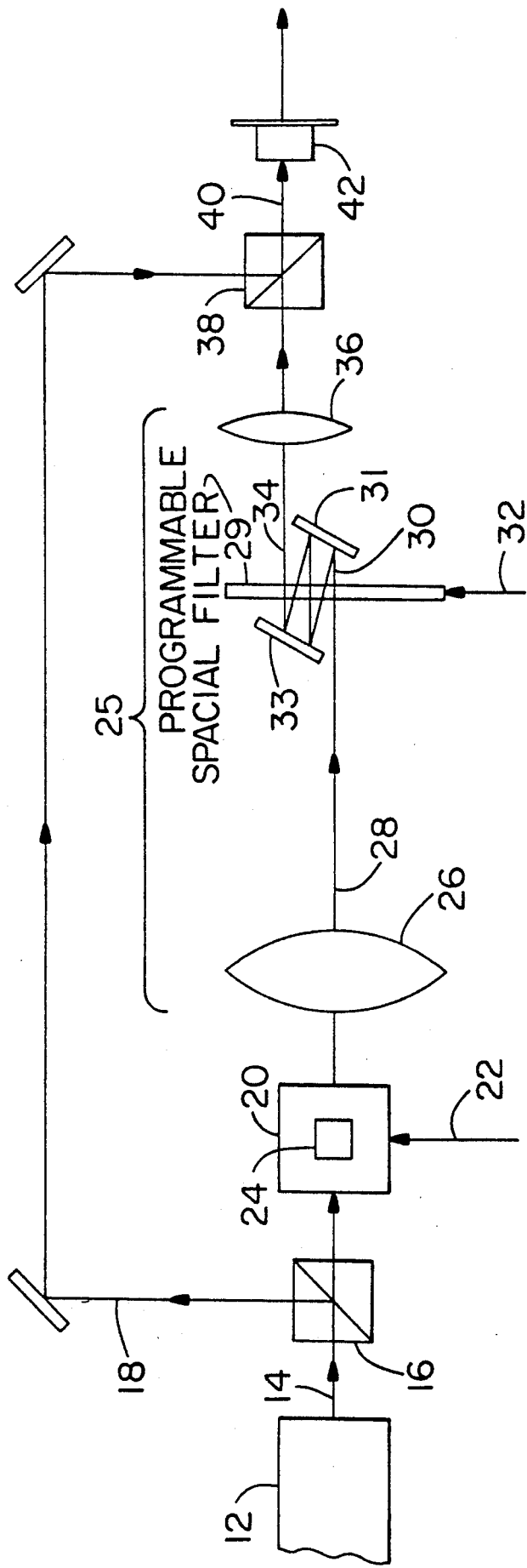
FIG. 1 is a simplified schematic arrangement of a prior art programmable optical notching filter system with multiple recursive stages embodied in a heterodyning optical filter system.

Referring to the drawings in detail, the simplified heterodyning system of FIG. 1 comprises a light source 12 producing a beam 14 of collimated, substantially coherent radiation which, after passing through a beamsplitter 16 to derive a reference beam 18 therefrom, is directed through a modulating means 20 for impressing spectral and/or temporal signal intelligence thereupon. An Acoustooptic Modulator such as the well known Bragg Cell or the like can be used for the modulating means 20. An RF input signal 22 drives the transducer portion 24, phase modulating the optical medium of the modulator 20 to impress the RF signal modulation onto the output beam thereof. The output beam is Fourier transformed by lens 26, and is introduced into a recursive filtering system 25 where the transformed image 28 is passed through a programmable spatial filter (PSF) 29. Unwanted frequencies are filtered by the programmable spatial filter 29, producing a spatially distributed and filtered RF spectra modulated optical output 34.

In heterodyning radio and radar receivers employing programmable spatial filtering techniques, the RF modulated optical signal is passed through a time integrating cueing optical receiver network which produces control signal 32, which drives the programmable spatial filter 29. The input signal 32 comprises the spatial locations of noise and interference in the received RF signal. The noise and interference spectra location information in signal 32 is used to configure the programmable spatial filter to reject the unwanted spectra in the frequency domain of the transformed image beam 28. The first pass output beam 30 is reflected by mirror 31 back through the programmable spatial filter (29) for further attenuation of the noise spectra. The reflected beam is reflected by a second mirror 33 back through the programmable spatial filter 29 and, after subsequent reflections by both mirrors 31 and 33, and consequential passages through the programmable spatial filter 29, the recursively filtered beam is inversely Fourier transformed by lens 36.

The inversely transformed signal is then relayed to an optical combiner 38 where it is combined with the reference (local oscillator) beam 18, and the combined beam 40 is square law detected at 42 to obtain the down converted and filtered RF signal. The electrical output signal can be subjected to conventional post-processing techniques.

The programmable spatial filter 29 blocks or passes spectra in the Fourier plane, and can be looked upon as a comb filter where each tooth corresponds to an element of the PSF. The elements can be activated (turned on) to block a signal or deactivated (turned off), thereby passing the signal. The PSF can be composed of a liquid crystal material sandwiched between glass plates which have 256 transparent tin oxide electrodes deposited onto the inner surfaces. The 256 elements are deposited onto one surface with electrodes fanned out for interfacing with a printed circuit card. The other inner surface of the PSF is called the back plane, and is a continuous and uniform deposition of transparent tin oxide. Masters for this process were obtained by first preparing an upscaled layout which uses a step-and-repeat process for maintaining a precise registration of element size and spacing. This upscaled layout was then photoreduced to the desired scale to obtain the master. Using this master and a photo etch process, the elements, fanned out electrodes, and back plane were formed on optical quality glass plate substrates. The inner surface of the two plates was then prepared with surfactant for alignment of the LC molecules. The LC materials (twisted nematic (TN) or Dynamic Scatter (DS)) were sandwiched between the glass plates and sealed to form a PSF cell. The present invention essentially eliminates all of these tedious steps.

Figure 2:
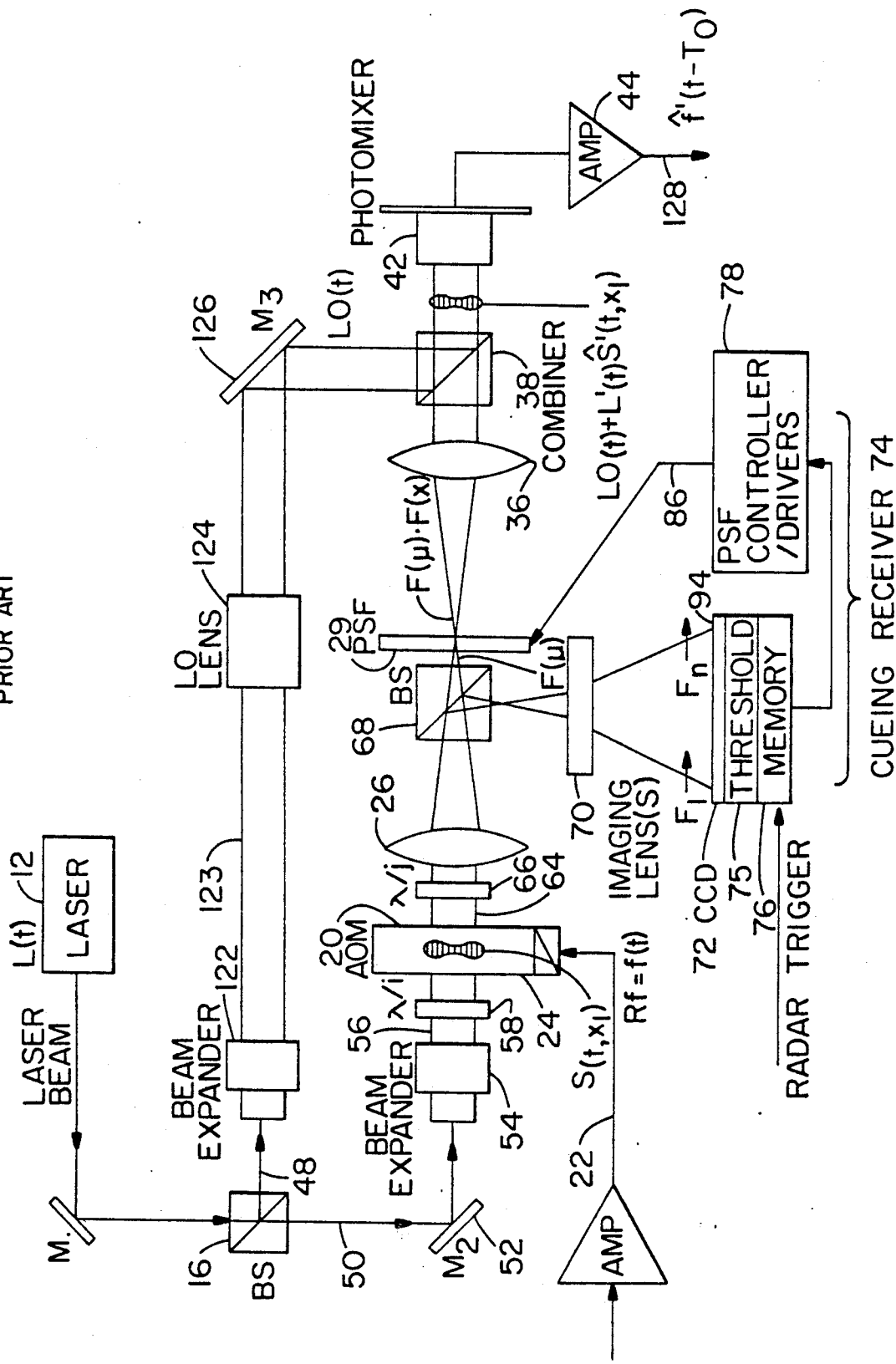
FIG. 2 illustrates a schematic arrangement of a programmable optical notching filter system showing more of the details thereof, particularly with respect to the electronically controlled and addressable liquid crystal programmable spatial light filter therein.

FIG. 2 illustrates a schematic arrangement of an ONF system showing more of the details thereof, particularly with respect to the associated electronics utilized to electronically control the programmable spatial filter in the ONF system. Referring thereto, a laser 12 produces a coherent, single frequency electromagnetic wave (light beam) of wavelength $\lambda$, with a typical $\lambda$ being 633 nm for a Helium Neon (HeNe) gas laser, and 820 nm for a semiconductor laser (laser diode). A single frequency output can be produced by a laser by controlling the optical cavity gain and, if required, by the addition of intra or extra cavity Fabry Perot interferometer structures. The emerging laser beam is partitioned by a beam splitter 16 to form a Local Oscillator (LO) beam 48 and a signal beam 50. These beams 48 and 50 are anamorphically (unidimensionally) expanded by beam expanders 122 and 54 to produce two substantially identical sheet beams 123 and 56. At this point, the LO beam is optically shaped by Lens(es) 124 and relayed to a photomixer 42 via $M_3$ and a beam combiner 38.

The signal beam 56 is first adjusted for polarization by a wave plate 58 to produce favorable entrance conditions to the Acoustooptic Modulator (AOM) 20. Here, the interaction of the acoustic wave produced by the RF signal 22 and the light wave results in an exiting beam 64 which bears the RF signal 22 in the form of narrow band phase modulation. The polarization is then optimized by a polarization adjuster 66 for mixing with the LO beam at the photomixer surface 42. The modulated beam is then Fourier transformed by a lens 26 which produces the Fourier transform of the signal beam at the back focal plane where the Programmable Spatial Filter (PSF) 29 is located. This transform plane is also imaged onto a Charge Coupled Device (CCD) 72 by a beam splitter 68 and an imaging lens system 70. This provides the power spectrum input to a cueing receiver 74. Passing through the PSF, those frequencies selected for excision are blocked by articulated fingers therein as described hereinabove. This function is shown as the product of the signal spectrum distributed in spatial coordinates $F(u)$ and the PSF filter pass-structure $F(x)$ (spatially, the electromagnetic interference (EMI) has now been removed). The inverse transform is taken by lens 36, and the image of the input field resides at the inverse transform plane as: $S(t, x_1)$. The photomixing process results in the down converted replica of the input signal with the EMI removed: $F(t - T_o)$.

The pass structure of the PSF is controlled by cueing receiver 74. The CCD 72 views the power spectrum (the combined RF signal, noise and EMI spectra) and samples the relative intensity of each frequency component. This is an integration process wherein CCD photogenerated charge packets in each of the cells are proportional to the incident light. After a suitable integration period, e.g., 2 $\mu$sec to 100 ms, these charge packets are sequentially clocked out of the CCD array 72. The location of each packet in the power spectrum is related to the timing sequence. Thus, as clock time proceeds, high-intensity (large charge) packets produce large voltage signal levels at the output of the CCD where the timing is tagged to frequency. The output of the CCD is an analog of the RF power spectrum which is passed through a threshold detector 75 and subsequently stored in a semiconductor memory 76. The high-intensity EMI levels over the spectral range $f_l$ to $f_n$ are then read into the PSF control circuits 78 where these tagged EMI are translated into element (or finger) locations which are fixed (latched up) for a selected time interval. For example, if the radar Pulse Repetition Interval (PRI) were 4 ms, then the PSF would be updated (unlatched and latched) every 4 ms. With time, the cueing receiver continues to track the EMI from pulse period to pulse period and directs the activities of the PSF elements. The PSF arrangement is always at least one pulse period behind the detection of the EMI in this type of implementation.

Figure 3:
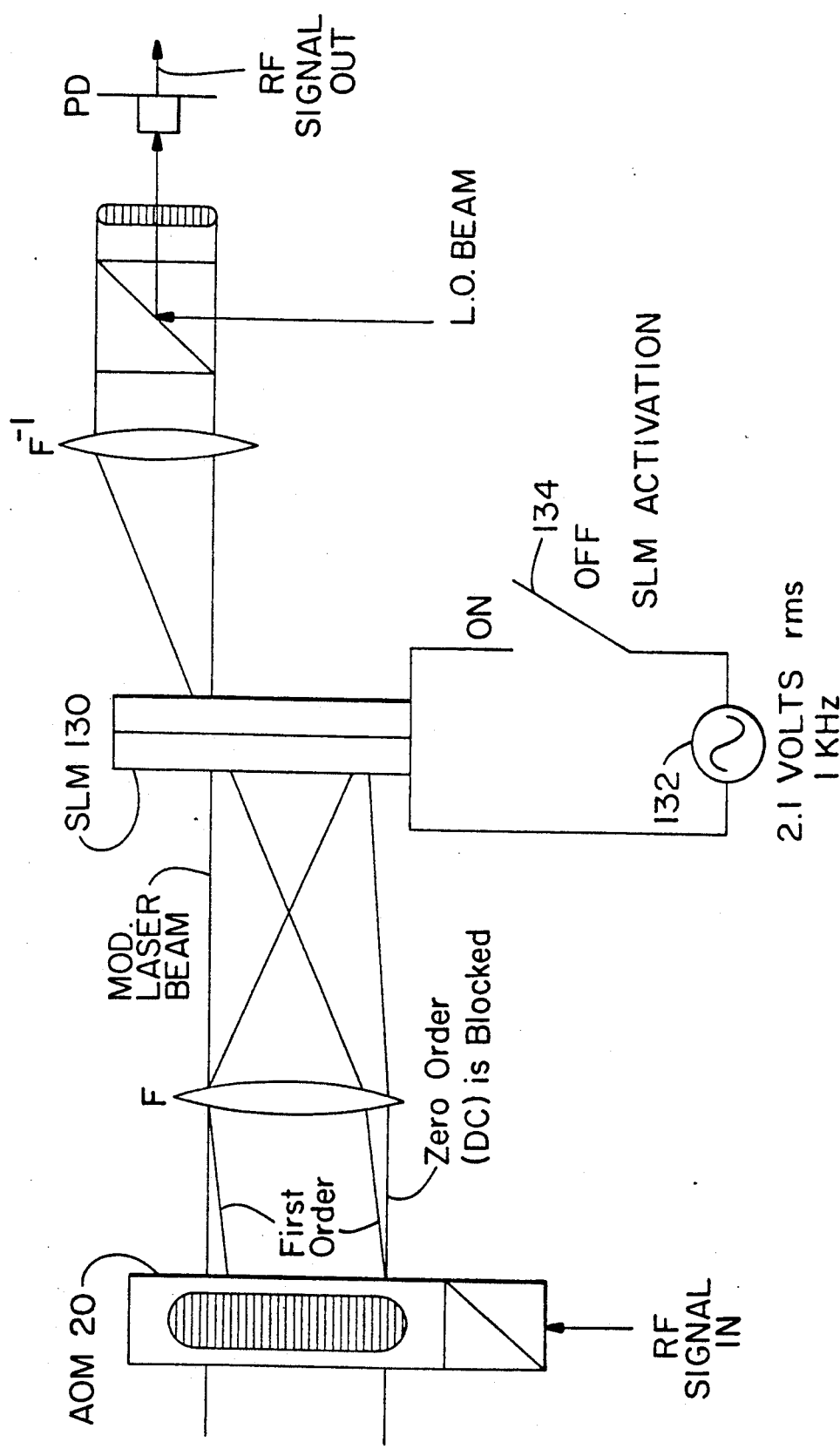
FIG. 3 is a schematic block diagram of a programmable optical notching filter system pursuant to the teachings of the present invention, utilizing a single pass programmable optical notching filter with a liquid crystal spatial light modulator which is written onto with light.

FIG. 3 is a schematic block diagram of a programmable optical notching filter system constructed pursuant to the teachings of the present invention and utilizing a single pass programmable optical notching filter with a liquid crystal spatial light modulator. The present invention uses a write with light approach on a liquid crystal spatial light modulator to form a programmable spatial filter, rather than using an electronically controlled and addressable liquid crystal programmable spatial filter and cueing receiver as in FIG. 2. This technical approach advantageously eliminates much of the recursive optical notching filter electronics illustrated in the cueing receiver 74 of FIG. 2 to provide a much more compact system design, and also significantly reduces the complexity and attendant power requirements of the system. Moreover, the technical approach of the subject invention significantly reduces the alignment sensitivities of the programmable spatial filter 29.

Referring to FIG. 3, the programmable spatial filter is formed by a light activated liquid crystal spatial light modulator 130, as for example by a cadmium sulfide liquid crystal spatial light modulator, designed to be written onto with light to form the programmable spatial filter, rather than by an electronically controlled and addressable PSF as in FIG. 2. The programmable spatial light modulator 130 is activated by a voltage source 132, and is written into by a write light source to control the location and depth of the notches in the passband of an RF receiver The controls can be either self activated, as in embodiments where an intensity threshold activates the blocking mechanism in the PSF, or by a programmed filter response, static or dynamic, achieved for example by polychromatic controls. As an example, a red wavelength $\lambda_1$ might not write into the spatial light modulator, while a second write wavelength $\lambda_2$ would cause the spatial light modulator to be activated in a region selected for notching. A combination of wavelengths could then be used to achieve any desired filter response, temporal and spatial, including notch width, notch depth, and notch resolution. For example, if the liquid crystal spatial light modulator is more sensitive to green wavelengths and less sensitive to red wavelengths, a yellow wavelength source would write less than a green source but more than a red source. Moreover, the present invention should allow a number of different types of radiation sources to be utilized, such as laser diodes or LEDs, which can operate at any suitable wavelength.

In operation of the embodiment of FIG. 3, an RF signal is fed as an input into the AOM 20. The optical notch filter is activated by applying an excitation voltage to the SLM, and deactivated by switching the voltage off. This embodiment can be operated in its simplest form with a single write and read source. For example, a HeNe laser operated at 633 nm is suitable. Modulating the HeNe laser with an RF continuous wave (CW) high level interferer yields a sufficiently great power density such that it overcomes the activation threshold of a twisted nematic, cadmium sulfide, liquid crystal SLM to write in the SLM medium, whereas a pulsed or spread spectrum signal will not activate the SLM. This embodiment is relatively simple since only one read-write source is required. Continued operation of the arrangement allows the same beam to be used as the read beam, in which the RF signal input with interference is filtered by the notches established in the SLM medium by the high level interferer. This allows "on the fly" filtering of the RF signal, which when inverse transformed and down converted at the photomixer, yields the original RF signal output with the interferers excised or notched out.

Figure 4:
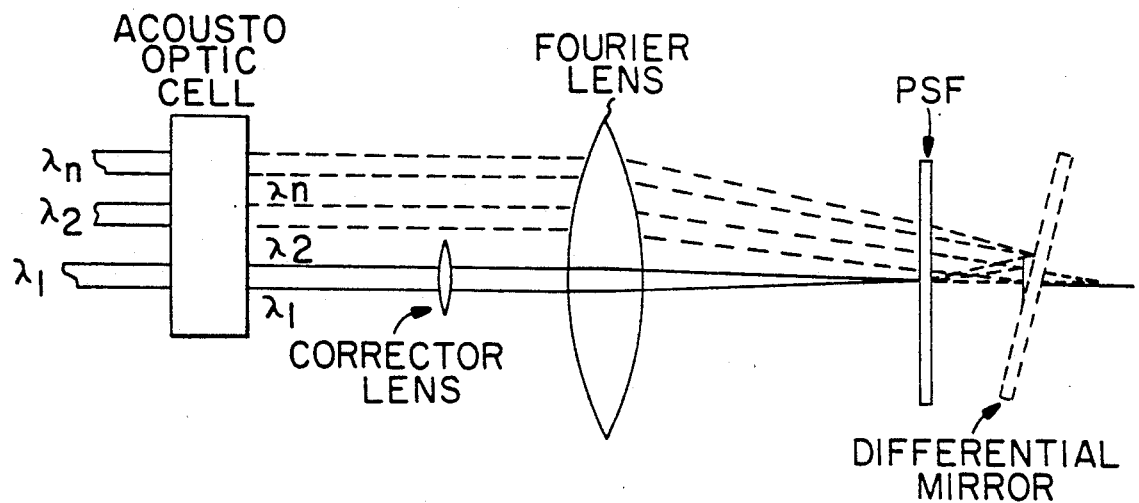
FIG. 4 illustrates both monochromatic and polychromatic embodiments of a spatial light modulator.

FIG. 4 illustrates both monochromatic and polychromatic embodiments of the present invention. For a monochromatic application $\lambda_2$ through $\lambda_n$ would be eliminated Thus, $\lambda_1$ would serve both write and read functions. A polychromatic wavelength write-read source would operate with wavelengths $\lambda_2$ through $\lambda_n$. Each wavelength would be in the form of a sheet beam of light, either noncoherent or coherent depending upon the desired results. In one experimental embodiment, a cadmium sulfide, liquid crystal SLM was operated at 1 KHz with 2.1 volts RMS excitation. A continuous wave narrow band interferer was used with a 1.5 $\mu$sec pulse modulated 30 MHz carrier. The notch was activated by applying an excitation voltage to the SLM, and deactivated by switching the voltage off, as shown by the switch 134 in FIG. 3. This embodiment was utilized in a laboratory experiment in which the waveforms of FIG. 8 were recorded. For this experiment, no polarizers or analyzers were incorporated, so that the twisted nematic cadmium sulfide liquid crystal (LC) SLM was apparently responding by rotation of its optic axis. Apparently, when this LC medium is excited, it distorts the signal wavefront in the region of the interferer, and therefore causes a loss of down conversion in that region. A HeNe laser was employed in this experimental arrangement, and it was noted that emission at 633 nm at low levels did not write in the SLM, However, a CW interferer has a much greater spectral power density overcomes the SLM threshold and writes in the SLM medium. The HeNe laser implementation is relatively simple since only one read-write source is required. For the experimental arrangement of FIGS. 3, a single pass structure was used (no Fourier plane recursion), such that with recursion a significant increase in notch depth would be expected.

Figure 5:
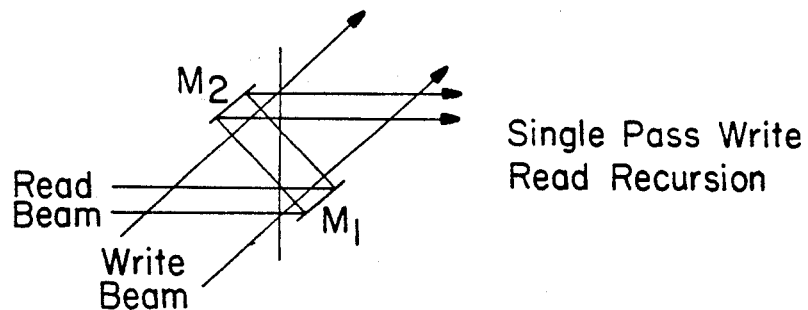
FIG. 5 illustrates an embodiment with a single pass write beam with read beam recursion.
Figure 6:
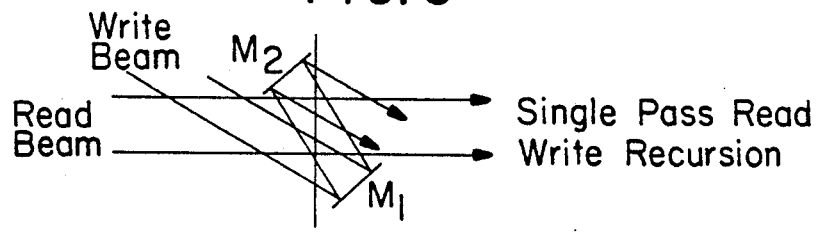
FIG. 6 illustrates an embodiment with a single pass read beam with write beam recursion.
Figure 7:
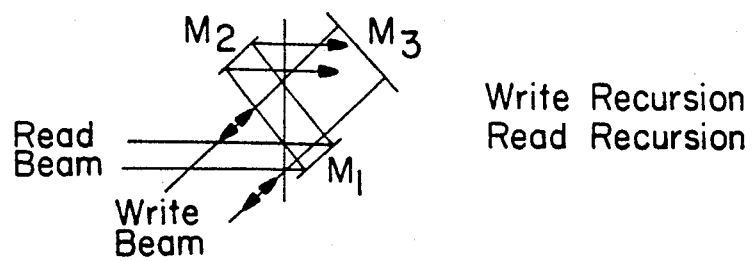
FIG. 7 illustrates an embodiment with recursion of both the write and read beams.

A more general embodiment which offers greater control would utilize a two or more wavelength system which might write at 520 nm (as by an LED) and read at 820 nm (as with a laser diode). Other read-write beam arrangements are also possible, as shown in FIGS. 4 through 7. A number of different recursion architectures can be employed to deliver maximum notch depth. For example, FIG. 5 illustrates an embodiment with a single pass write beam, with read beam recursion, while FIG. 6 illustrates an embodiment with a single pass read beam, with write beam recursion. FIG. 7 illustrates an embodiment with recursion of both the write and read beams.

Figure 8:
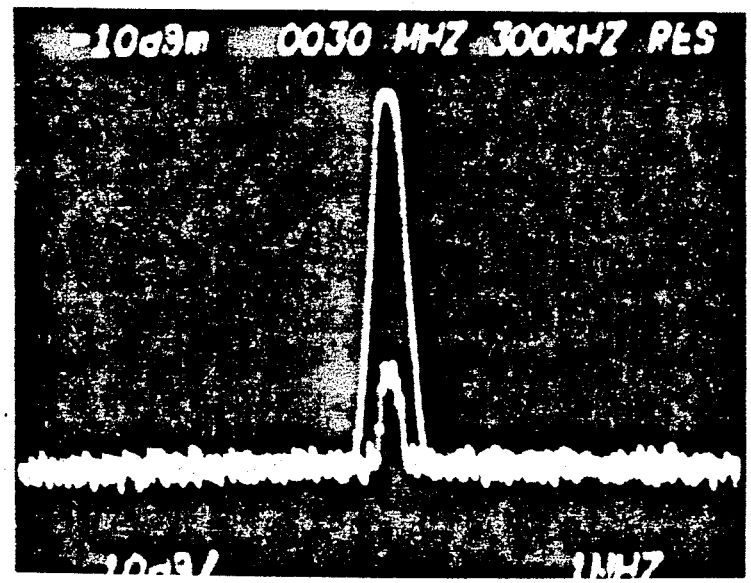
FIG. 8 illustrates output waveforms which were obtained during operation of a prototype optical notching filter system as shown in FIG. 3, and illustrates operation of the system with and without operation of the spatial filter.

FIG. 8 illustrates two signal waveform outputs, with the larger signal being the system output signal when the switch of FIG. 3 was off, and the smaller waveform being when the switch was on and the optical notching filter was operational. A 30 MHz CW signal was an input to the AOM and the output signal was monitored on a Tektronix 7L14 spectrum Analyzer. The high state is shown when the SLM is deactivated (switch open), and the low level is shown when the system was activated, causing a notch to be formed by the intensity of the signal where it impinges on the SLM. With the SLM deactivated, the signal passes through the system without attenuation. For the waveform shown, the attenuation was greater than 30 db.

While several embodiments and variations of the present invention for a write with light optical notching filter are described in detail herein, it should be apparent that the disclosure and teachings of the present invention will suggest many alternative designs to those skilled in the art.

What is claimed is:

1. An optical filtering system, comprising an input means for receiving an input electrical signal which is to be filtered by the system, means for producing an optical Fourier transform of the input electrical signal being filtered by the system, an optical spatial filter which passes unfiltered components of the signal being filtered and blocks filtered components of the signal being filtered, and means for producing an optical inverse Fourier transform of the unfiltered components of the signal which are passed by said optical spatial filter, said optical spatial filter being located in the focal plane of said Fourier transform producing means and comprising a liquid crystal spatial light modulator, and means for writing filtering information into said liquid crystal spatial light modulator with light.

2. An optical filtering system as claimed in claim 1, further comprising a first source of radiation for writing into the spatial light modulator, and a second source of radiation for reading out of the spatial light modulator, with said first and second sources of radiation operating at different wavelengths.

3. An optical filtering system as claimed in claim 1, said spatial light modulator including a single pass write beam, and a recursive, multiple pass red beam.

4. An optical filtering system as claimed in claim 1, said spatial light modulator including a single pass read beam and a recursive, multiple pass write beam .

5. An optical filtering system as claimed in claim 1, said spatial light modulator including a recursive. multiple pass read beam and a recursive multiple pass write beam.

6. An optical filtering system as claimed in claim 1, said spatial light modulator including a multispectral beam source for operation at different operational frequencies.

* * * * *